(No Model.) 2 Sheets—Sheet 1.

F. MILLER.
FRICTION CLUTCH.

No. 457,440. Patented Aug. 11, 1891.

WITNESSES.
E. L. Thurston
W. J. Bainbridge

INVENTOR.
Frank Miller.

(No Model.) 2 Sheets—Sheet 2.
F. MILLER.
FRICTION CLUTCH.
No. 457,440. Patented Aug. 11, 1891.
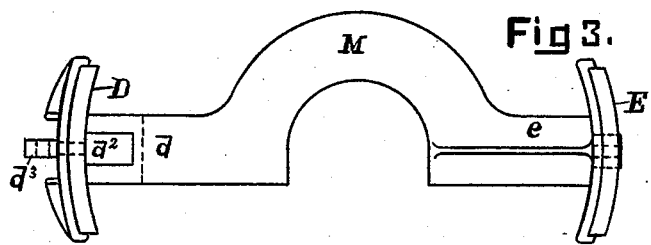
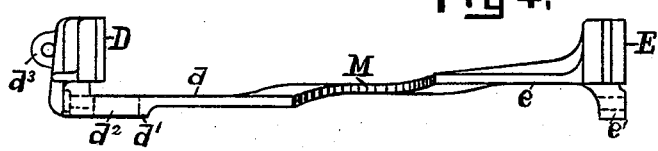
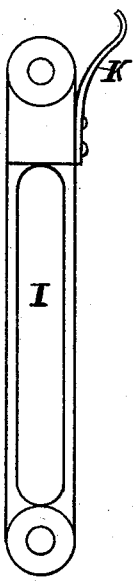
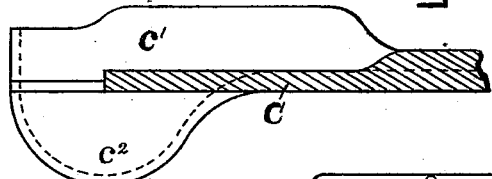
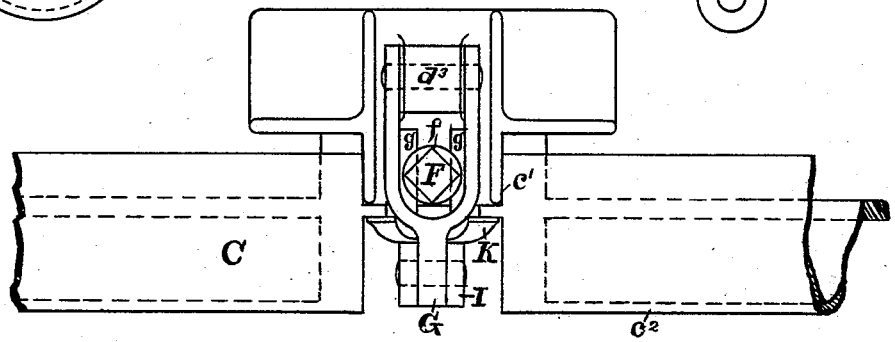
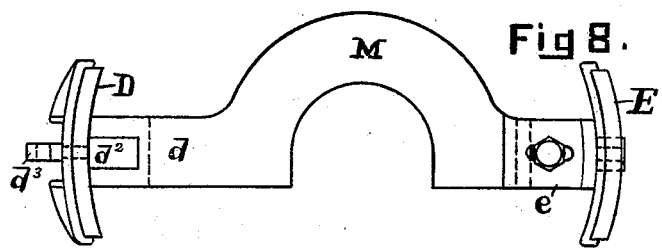
WITNESSES.
E. I. Thurston
W. J. Bainbridge
INVENTOR.
Frank Miller.

UNITED STATES PATENT OFFICE.

FRANK. MILLER, OF CLEVELAND, OHIO.

FRICTION-CLUTCH.

SPECIFICATION forming part of Letters Patent No. 457,440, dated August 11, 1891.

Application filed February 11, 1889. Serial No. 299,383. (No model.)

*To all whom it may concern:*

Be it known that I, FRANK. MILLER, a citizen of the United States, residing at Cleveland, in the county of Cuyahoga and State of Ohio, have invented certain new and useful Improvements in Friction-Clutches, of which the following is a full, clear, and exact description, reference being had to the accompanying drawings, in which—

Figure 1:
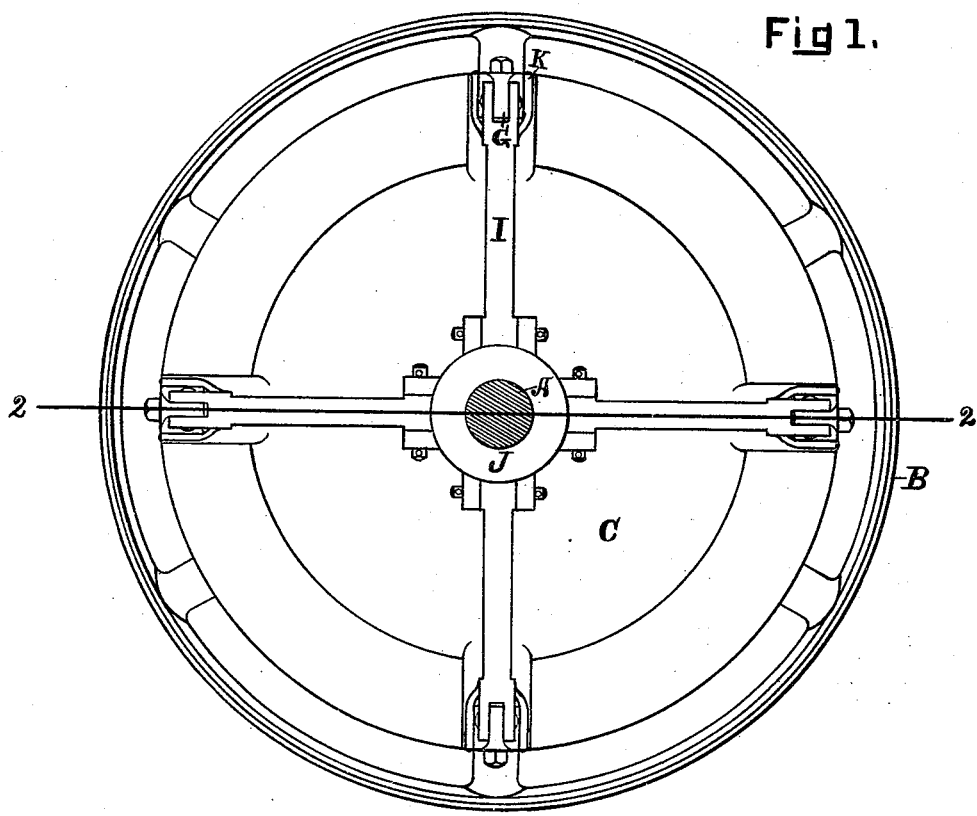
Figure 2:
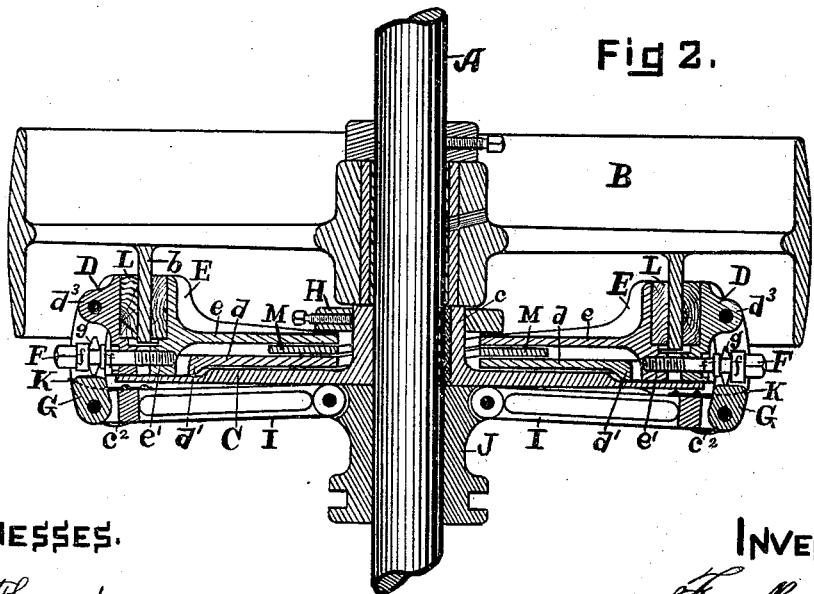

Figure 1 is a side elevation of my improved clutch. Fig. 2 is a central sectional view on the line 2 2, Fig. 1. Fig. 3 is a plan view of one of the clutch members. Fig. 4 is a side view of the same. Fig. 5 is a detached view of the link which transmits the movement of the shifting sleeve to the clutch members. Fig. 6 is an edge view of a portion of my improved clutch mechanism. Fig. 7 is a central radial section through the outer end of one of the grooves in the clutch-frame. Fig. 8 is a plan view of one of the clutch members, somewhat modified in form.

My invention relates to that class of friction-clutches in which a cylindric pulley-flange is grasped between two inversely and radially moving jaws. It is necessary to the successful operation of such clutches that there shall be more than one pair of jaws, and that said jaws and their operating mechanism shall be so mounted upon the shaft that they will balance each other. This result is usually secured by constructing the clutches with two, four, or six pairs of jaws, as the case may be, arranged so that each pair will be balanced by a pair diametrically opposed thereto. In clutches of this style when in revolution, centrifugal force acting upon the two jaws tends to throw the inner jaw against the flange and the outer jaw away from the flange, thereby making it difficult both to engage and to release both jaws. It is therefore another prerequisite to the successful operation of this style of clutch to overcome this tendency of centrifugal force to prevent the proper working of the parts, and this hitherto has been accomplished by some form of connection between the outer and inner jaw of each pair, whereby the centrifugal force acting on one jaw will act against that acting upon the other jaw.

The object of my invention is to produce a friction-clutch which shall be perfectly balanced, in which the effect of centrifugal force acting upon the jaws shall be so overcome as to permit the easy movement of the jaws, and which shall be certain in operation and cheap in construction.

To this end it consists, first, in connecting the outer jaw of each pair with the inner jaw of the pair diametrically opposed thereto; second, in a novel form of clutch member having the following integral parts—viz., a curved central part, shanks on each side thereof parallel with each other and in the same radial plane, a convex friction-surface at the end of one shank and a concave friction-surface at the end of the other shank; third, in the combination of two such clutch members with two levers pivotally connected with their outer ends, a shifting sleeve, and connecting-links between said levers and sleeve, and also in the other novel combinations, sub-combinations, and details of construction herein shown and described, and pointed out definitely in the claims.

Referring to the drawings, A represents a shaft, upon which is loosely mounted a pulley B, having the cylindric flange *b*.

C represents the clutch-frame, the hub *c* of which is keyed or otherwise secured to the shaft A. The purpose of this frame is to support and guide the movable clutch members, and it is shown in the form of a disk having radial guides for said clutch members. Except to secure certain results hereinafter named, it is not essential that this frame be of the form shown; but it may be of any other suitable form known to the art.

One of the clutch members is shown in Figs. 3 and 4. It consists, first, of a shank *d;* second, a shank *e;* third, a concave friction-surface D, adapted to engage with the flange *b* on the outside thereof on the outer end of the shank *d;* fourth, a convex friction-surface E, adapted to engage on the inside of the flange *b* at a point diametrically opposed to the surface D on the outer end of the shank *e*, and, fifth, a connection M between the inner ends of the shanks *d* and *e*. In the form shown this friction member is composed of a single piece of metal, the central and connecting part M being curved to permit it to pass around the shaft A. The shanks *d* and *e* lie, when the parts are assembled, in substantially the same radial plane; but the member is bent at the points of union of the shanks $d$ and $e$ with the central connecting part M, so that the two shanks lie in planes transverse to the shaft, which are parallel to each other. It is not necessary that the central connecting part should have any great strength, since the only strain to which it can be subjected is a pulling strain when the clutch is being released. On the back side of the shank $d$ is a radial offset $d'$, through which passes a radial slot $d^2$. On the back of the shank $e$ is an offset $e'$, fitted to slide in said slot $d^2$. When the parts are assembled, as shown, two of these members are placed so that their curved central parts M pass around the shaft in opposite directions. The offsets $d'$ $d'$ fit into radial grooves $c'$ in the frame C on opposite sides of the shaft, whereby the lateral strain is sustained and the shanks $d$ compelled to move in radial paths. The offsets $e'$ fit into the slots $d^2$, and a bolt F passes radially through the shank $d$ (there being a sliding fit) and screws into the end of the shank $e$, or, more exactly, as shown, into the offset $e'$. By this arrangement the members are permitted an independent radial movement, but are prevented from moving in any other manner except together.

H represents a collar which is fastened to the hub $c$, and by its position prevents the members from becoming displaced from their seats in the clutch-frame. It will be noticed that the concave friction-surface on one member and the convex friction-surface on the other member form, respectively, the outer and inner jaws of a pair, and that two such pairs are formed which grasp the flange between them at points diametrically opposed.

G G represent levers which are each pivoted at one end to a lug $d^3$ on the outer end of the outer jaw D. Their other ends are connected by means of the links I to the shifting sleeve J. These levers G are slotted, and the lugs $g$ $g$ extend from the inner sides of said slots and engage between the shoulders $f$ $f$ on the bolts F. A spring K is secured to each link I and thrusts against the outside of the frame C, thereby assisting the collar H to hold the clutch members against the frame C and preventing the parts from rattling during revolution.

In operation, when the sleeve J is moved backward from the locked position shown in Fig. 2, the ends of the levers G are drawn toward the shaft, which causes the jaws D to move outward and the jaws E inward, thus releasing the flange $b$. The centrifugal force acting on each outer jaw will either balance or exceed the centrifugal force acting on the inner jaw on the opposite side of the shaft, so that centrifugal force acting on each outer jaw will either draw or assist the operator in drawing the inner jaws away from the flange, thereby effecting a complete release.

Another advantage resulting from the connection of an outer with an inner jaw on the opposite side of the shaft is, that it is not necessary to employ the operating mechanism, any fixed pivotal points thereby reducing the friction of the moving parts and cheapening the construction.

It will be noticed that all the operating parts are on the inside of the frame C, which, by being made in the form of a disk, protects said parts from any interference from outside bodies. The curve $c^2$ at the outer edge of this disk extends to or beyond the ends of the levers G, and thereby protects said levers from being accidentally moved—as, for example, by the belt—if the same should slip off. By the arrangement of the offsets $d'$ and $e'$ at or near the outer ends of the shanks $d$ and $e$ the lateral strain upon the clutch members is borne by the frame at points directly in line with the points where such strain is applied—viz., directly opposite the friction-surfaces. The adjustment of the jaws to compensate for wear upon the jaws, or the wooden blocks L, with which they are usually faced, is made by screwing the bolt F farther into the offset $e'$ on the back of the inner shank $e$.

Fig. 8 shows a form of the clutch members by which it may be made shorter or longer, as desired, to compensate for unequal wear on the jaws, or to enable the same member to fit flanges differing slightly as to thickness and diameter. It is made in two parts, one of which is slotted, and the two parts are rigidly secured together by bolts which pass through said slots.

I hereby disclaim as of my invention the combination of a pulley having an annular friction-flange, the hub secured on the shaft and provided with radial arms, movable jaws, and levers pivoted to said jaws and free from said arms.

Having thus described my invention, what I claim as new, and desire to secure by Letters Patent, is—

1. In a friction-clutch, a clutch member for a friction-clutch consisting of a curved central part, shanks on each side thereof lying in different parallel planes, a convex friction-surface at the outer end of one shank, and a concave friction-surface at the outer end of the other shank, said surfaces being adapted to engage with a cylindric flange at points diametrically opposed, substantially as and for the purpose specified.

2. In a friction-clutch, a clutch member for a friction-clutch consisting of the shank $d$, having the offset $d'$, the slot $d^2$, and the concave friction-surface D, and the shank $e$, having the offset $e'$ and the convex friction-surface E, and the curved part M, connecting the inner ends of said shanks, substantially as and for the purpose specified.

3. In a friction-clutch, the combination of a pulley having a cylindric flange and two pairs of inversely and radially movable jaws arranged to grasp said pulley-flange at points diametrically opposed to each other, the outer jaw of each pair being directly connected with the inner jaw of the opposite pair by a suitable device which extends from one side of the shaft to the other, substantially as and for the purpose specified.

4. In a friction-clutch, the combination of a clutch frame having radial guides and two clutch members each having two shanks connected by a curved central part, a convex friction-surface at the end of one shank, and a concave friction-surface at the end of the other shank, arranged, substantially as shown, with levers pivoted to those ends of the members which have the concave friction-surfaces, a shifting sleeve, links connecting said sleeve and the outer ends of said levers, and pivotal connections between said levers and the ends of said clutch members which have the convex frictional surfaces, substantially as and for the purpose specified.

5. In a friction-clutch, the combination of two clutch members, each consisting of the shank $d$, having the offset $d'$, the slot $d^2$, and the concave friction-surface D, the shank $e$, having the offset $e'$ and the convex surface E, and the curved part M, connecting said two shanks with a clutch-frame having radial grooves, bolts F, having the annular shoulders $f f$, levers G, having the lugs $g g$, the links I, and the shifting sleeve, substantially as and for the purpose specified.

6. In a friction-clutch, the combination of two clutch members of the form specified and the clutch-frame having radial guides with the levers G, each having three movable pivotal points of connection—viz., at its ends with a link and the outer jaw of one clutch-member, respectively, and near its middle with the inner jaw of the other clutch member—a shifting sleeve, and the links connecting said shifting sleeve and levers, substantially as and for the purpose specified.

7. In a friction-clutch, the combination of a pulley having a cylindric flange and two pairs of inversely and radially moving clutch members arranged on the inside of the clutch-frame, and levers for operating said clutch members and connecting therewith at the outer ends thereof with a disk-shaped clutch-frame having an annular curved projection near its outer periphery extending to or beyond the ends of said levers, substantially as and for the purpose herein specified.

FRANK. MILLER.

Witnesses:
E. L. THURSTON,
WILL J. BAINBRIDGE.